(12) United States Patent
Khandelwal et al.

(10) Patent No.: US 11,587,452 B2
(45) Date of Patent: Feb. 21, 2023

(54) INFORMATION PROCESSING APPARATUS, DATA GENERATION METHOD, AND NON-TRANSITORY COMPUTER-READABLE MEDIUM

(71) Applicant: NEC CORPORATION, Tokyo (JP)

(72) Inventors: Kanishka Khandelwal, Tokyo (JP); Hiroshi Tamano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 485 days.

(21) Appl. No.: 16/635,389

(22) PCT Filed: Feb. 28, 2019

(86) PCT No.: PCT/JP2019/007795
§ 371 (c)(1),
(2) Date: Jan. 30, 2020

(87) PCT Pub. No.: WO2020/174653
PCT Pub. Date: Sep. 3, 2020

(65) Prior Publication Data
US 2021/0225184 A1    Jul. 22, 2021

(51) Int. Cl.
G09B 5/08    (2006.01)
G06F 11/34    (2006.01)
G09B 5/02    (2006.01)

(52) U.S. Cl.
CPC ............ *G09B 5/08* (2013.01); *G06F 11/3438* (2013.01); *G06F 11/3476* (2013.01); *G09B 5/02* (2013.01)

(58) Field of Classification Search
CPC ....................................................... G09B 5/08
See application file for complete search history.

(56) References Cited

U.S. PATENT DOCUMENTS 8,718,534 B2    5/2014  Srinivas et al.
10,108,694 B1*  10/2018  Moody ............. G06F 16/24573
10,599,656 B1*  3/2020  Sharma ............... G06F 16/2457
(Continued)

FOREIGN PATENT DOCUMENTS

JP    2009-163615 A    7/2009
WO    2017/199552 A1   11/2017

OTHER PUBLICATIONS

Shuhei Kuwata et al., "Co-clustering Discrete Data Based on the Dirichlet Process Mixture Model", Information Processing Society of Japan, Nov. 15, 2008, pp. 60-73, vol. 1, No. 1.

*Primary Examiner* — Justin S Lee
(74) *Attorney, Agent, or Firm* — Sughrue Mion, PLLC

(57) ABSTRACT

An object is to provide an information processing apparatus capable of analyzing operation log data that can be acquired through a digital device and effectively using the operation log data. An information processing apparatus (10) according to the present disclosure includes an information collection unit (11) configured to collect an operation log generated when a digital device is operated from a plurality of the digital devices, an execution unit (12) configured to co-cluster operator information and content information. The operator information is for identifying an operator of the digital device included in a plurality of the operation logs, and the content information is about content viewed by the operator using the digital device, and a post-processing unit (13) configured to create confirmation data using an execution result of the co-clustering.

9 Claims, 9 Drawing Sheets

(56) References Cited

U.S. PATENT DOCUMENTS

| | | | |
|---|---|---|---|
| 11,023,496 B1* | 6/2021 | Chklovski | H04L 51/04 |
| 11,106,686 B1* | 8/2021 | Chung | H04L 67/535 |
| 11,372,873 B2* | 6/2022 | Lindley | G06F 16/43 |
| 2002/0116710 A1* | 8/2002 | Schaffer | H04N 21/4532 |
| | | | 725/35 |
| 2004/0098744 A1* | 5/2004 | Gutta | H04N 21/6582 |
| | | | 725/39 |
| 2007/0239682 A1* | 10/2007 | Arellanes | G06F 16/951 |
| 2010/0146530 A1* | 6/2010 | Bolyukh | H04N 21/8358 |
| | | | 725/14 |
| 2011/0061069 A1* | 3/2011 | Arte | H04N 21/4826 |
| | | | 725/87 |
| 2013/0031093 A1* | 1/2013 | Ishida | G06Q 30/0269 |
| | | | 707/E17.089 |
| 2016/0071129 A1* | 3/2016 | Ohhara | G06Q 30/0203 |
| | | | 705/7.32 |
| 2017/0116316 A1 | 4/2017 | Shin et al. | |
| 2018/0067939 A1* | 3/2018 | St. Thomas | G06Q 30/0255 |
| 2019/0333256 A1* | 10/2019 | Xu | G06F 16/904 |
| 2019/0340670 A1* | 11/2019 | Tomobe | G06Q 30/0631 |
| 2020/0007936 A1* | 1/2020 | Salomatin | H04N 21/254 |

\* cited by examiner

| STUDENT ID | LECTURE ID | OPERATION | PAGE | MARKER | EVENT TIME |
|---|---|---|---|---|---|
| xxxxa7 | xxxxx0b | OPEN | 1 | | 4/9/2018 12:58:04 PM |
| xxxxa7 | xxxxx0b | NEXT | 1 | | 4/9/2018 1:00:08 PM |
| xxxxa7 | xxxxx0b | ADD_MARKER | 2 | difficult | 4/9/2018 1:00:09 PM |
| xxxxa7 | xxxxx0b | PAGE_JUMP | 2 | | 4/9/2018 1:00:49 PM |

Fig. 2

|   | Slide ID | | | |
|---|---|---|---|---|
|   | 1 | 2 | 3 | ·· |
| 1 | 0 | 1 | 1 | ·· |
| 2 | 1 | 1 | 1 | ·· |
| 3 | 0 | 0 | 1 | ·· |
| ·· | ·· | ·· | ·· | ·· |

Student ID (row label)

Fig. 4

INFORMATION PROCESSING APPARATUS, DATA GENERATION METHOD, AND NON-TRANSITORY COMPUTER-READABLE MEDIUM

INCORPORATION BY REFERENCE

This application is based upon and claims the benefit of priority from PCT patent application No. PCT/JP2019/007795, filed on Feb. 28, 2019, the disclosure of which is incorporated herein in its entirety by reference.

TECHNICAL FIELD

The present disclosure relates to an information processing apparatus, a data generation method, and a program.

BACKGROUND ART

Recently, digital devices have become widespread. Consequently, the number of users who view books using digital devices is also increasing. Lectures using digital devices are also conducted at places of education. For example, a teacher stores lecture materials on a server, and students access the lecture materials on the server and take a lecture.

Teachers can easily collect or create data useful for future lectures by using digital devices for lectures. For example, when students take tests online, a lecture system promptly collects test scores of the respective students. Furthermore, a teacher can easily analyze a score distribution and the like by using analysis software. Moreover, the teacher can complete the analysis on the test score in a short time by using software that automatically executes processing from aggregation of test scores to an analysis of a specific distribution or the like.

U.S. Pat. No. 8,718,534 discloses collecting assessment data regarding students and clustering the collected data. A result of the clustering is used for an analysis by a teacher.

SUMMARY

The use of a digital device for a lecture enables a teacher to acquire various pieces of data via a network, such as how far students are reading lecture materials and how long they are viewing lecture materials. However, U.S. Pat. No. 8,718,534 only discloses a method for utilizing the assessment data, and thus has a problem in which operation log data that can be acquired through a digital device is not analyzed, and a result of the clustering is not effectively utilized.

An object of the present disclosure is to provide an information processing apparatus, a data generation method, and a program that can analyze operation log data that can be acquired through a digital device and can effectively use the operation log data.

In a first example aspect of the present disclosure, an information processing apparatus includes: an information collection unit configured to collect an operation log generated when a digital device is operated from a plurality of the digital devices; an execution unit configured to co-cluster operator information and content information, the operator information for identifying an operator of the digital device included in a plurality of the operation logs, and the content information being about content viewed by the operator using the digital device; and a post-processing unit configured to create confirmation data using an execution result of the co-clustering.

In a second example aspect of the present disclosure, a method of generating data includes: collecting an operation log generated when a digital device is operated from a plurality of the digital devices; co-clustering operator information and content information, the operator information for identifying an operator of the digital device included in a plurality of the operation logs, and the content information being about content viewed by the operator using the digital device; and creating confirmation data using an execution result of the co-clustering.

In a third example aspect of the present disclosure, a non-transitory computer readable medium storing a program causing a computer to execute: collecting an operation log generated when a digital device is operated from a plurality of the digital devices; co-clustering operator information and content information, the operator information being for identifying an operator of the digital device included in a plurality of the operation logs, and the content information being about content viewed by the operator using the digital device; and creating confirmation data using an execution result of the co-clustering.

According to the present disclosure, it is possible to provide an information processing apparatus, a data generation method, and a program capable of analyzing operation log data that can be acquired through a digital device and effectively using the operation log data.

BRIEF DESCRIPTION OF DRAWINGS

The above and other aspects, features, and advantages of the present disclosure will become more apparent from the following description of certain example embodiments when taken in conjunction with the accompanying drawings, in which:

FIG. 2 is a diagram showing an operation log according to the first example embodiment;

FIG. 4 shows a matrix generated by a pre-processing unit according to the second example embodiment;

EMBODIMENTS

First Example Embodiment

Figure 1:
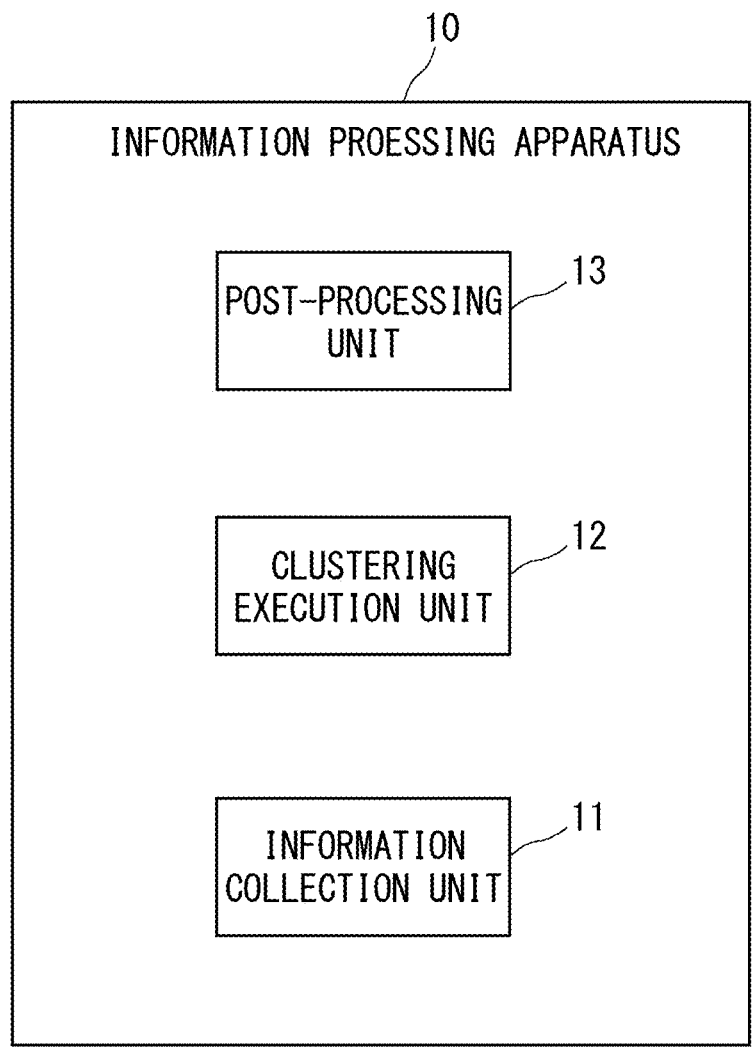
FIG. 1 is a configuration diagram of an information processing apparatus according to a first example embodiment.

Hereinafter, example embodiments of the present disclosure will be described with reference to the drawings. A configuration example of an information processing apparatus 10 according to a first example embodiment will be described with reference to FIG. 1. The information processing apparatus 10 may be a computer apparatus that operates when a processor executes a program stored in a memory. The information processing apparatus 10 may be, for example, a server apparatus.

The information processing apparatus 10 includes an information collection unit 11, a clustering execution unit 12, and a post-processing unit 13. The components of the information processing apparatus 10, such as the information collection unit 11, the clustering execution unit 12, and the post-processing unit 13, may be software or modules that execute processing when a processor executes a program stored in the memory. Alternatively, the components of the information processing apparatus 10, such as the information collection unit 11, the clustering execution unit 12, and the post-processing unit 13, may be hardware such as a circuit or a chip.

The information collection unit 11 collects, from a plurality of digital devices, operation logs generated when the digital devices are operated. The information collection unit 11 may collect the operation logs via a network. For example, the information collection unit 11 may collect the operation logs via wireless lines or wired lines.

The digital device may be, for example, a smartphone terminal, a tablet terminal, a personal computer, and an electronic book reader. The digital device is used, for example, as means for a user to view electronic data or content. The electronic data or content may be, for example, an electronic book, a still image, and a moving image. For example, as shown in FIG. 2, the operation log may include an ID of a student who is an operator of the digital device and a lecture ID of a lecture that the student is attending. The operation log may be information regarding a button of the digital device that the user has pressed to view the content and so on, information about a time for viewing the content, information about a time for viewing each page of a slide included in the content, and the like. The operation log is not limited to the information shown in FIG. 2, and may include various pieces of information related to user operations.

The clustering execution unit 12 executes Co-Clustering using operator information for identifying the operator of the digital device and content information of the content viewed by the operator using the digital device. The operator information and the content information are included in the operation log. Specifically, the clustering execution unit 12 executes co-clustering on a matrix generated using the information included in the operation log. The operator information may be referred to as, for example, an operator ID (Identification). The content information includes, for example, slide information for identifying a plurality of slides included in the content. The slide information may also be referred to as a slide ID, a page ID, page information, or a page number. The content information may further include content viewing time information, viewing time information for each page or each slide included in the content, and the like.

The post-processing unit 13 creates confirmation data using an execution result of the co-clustering. The execution result of the co-clustering may be, for example, information indicating a cluster related to the operator and a cluster related to the slide generated based on the relationship between the operator and the slide viewed by the operator. The confirmation data is data that can be displayed on a display apparatus such as a display of the information processing apparatus 10 or another information processing apparatus.

As described above, the information processing apparatus 10 can execute the co-clustering using information included in the operation log. As a result, the information processing apparatus 10 can perform an effective analysis utilizing the operation log. Furthermore, by the information processing apparatus 10 creating the execution result of the co-clustering execution result in viewable and audible data, it is possible to easily utilize the execution result of the co-clustering.

Second Example Embodiment

Figure 3:
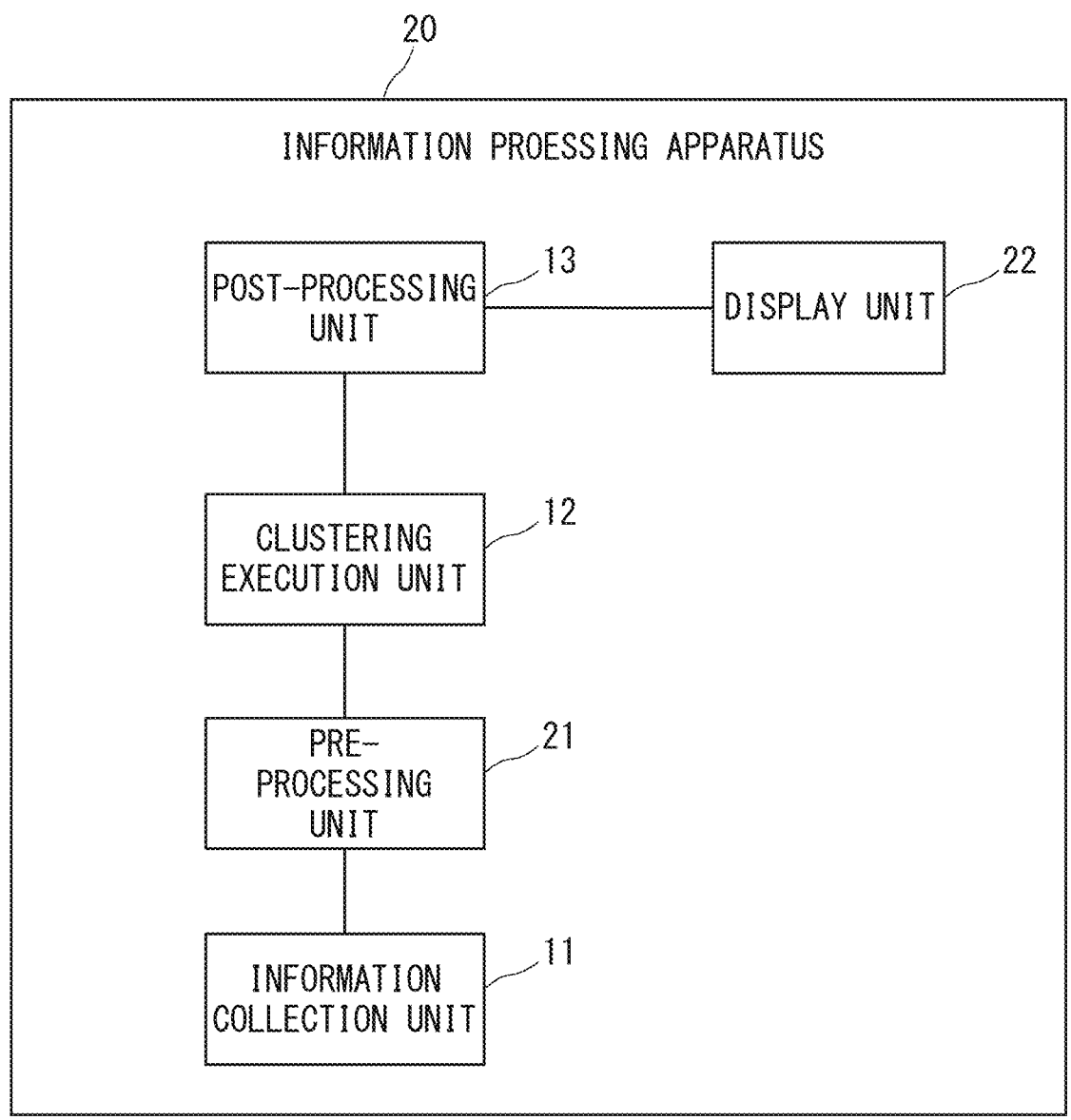
FIG. 3 is a configuration diagram of an information processing apparatus according to a second example embodiment.

Next, a configuration example of an information processing apparatus 20 according to a second example embodiment will be described with reference to FIG. 3. In the information processing apparatus 20, functions or configurations similar to those of the information processing apparatus 10 of FIG. 1 will be described using the same symbols as those of the information processing apparatus 10. The information processing apparatus 20 includes an information collection unit 11, a clustering execution unit 12, a post-processing unit 13, a pre-processing unit 21, and a display unit 22.

The information collection unit 11 may collect operation logs from a plurality of digital devices via a network and, for example, may also collect test scores of students who operate respective digital devices. The information collection unit 11 may collect the test scores from a server or the like that manages the test scores via the network or may collect the test score from each digital device via the network. The information collection unit 11 may collect shifts in test scores, average scores, and deviation scores of the respective students or an average score of a plurality of students, and so on, in addition to the test scores. Information such as the test scores, shifts in the scores, average scores, and deviation scores will be described below as evaluation information.

The pre-processing unit 21 generates a matrix using information included in the operation log collected by the information collection unit 11. Further, the pre-processing unit 21 may generate a matrix using the operation log. Here, the matrix generated by the pre-processing unit 21 will be described. In the following descriptions, an operator included in the operation log is described as a student who operates the digital device.

The matrix may be information indicating which slide the student has viewed among a plurality of slides included in the content information, for example. The content may be, for example, electronic data such as text, reference books, textbooks, and the like that are viewed or referred by students during lectures. Here, the matrix generated by the pre-processing unit 21 will be described with reference to FIG. 4. The matrix of FIG. 4 shows associations between student IDs and slide IDs. In the matrix, 1 is set for the slide viewed by the student, and 0 is set for the slide not viewed by the student. For example, the matrix of FIG. 4 indicates that the student with a student ID 1 has viewed slides 2 and 3 and has not viewed a slide 1.

In addition to the matrix shown in FIG. 4, the pre-processing unit 21 may generate a matrix that indicates how much time the student has spent viewing each slide. Such a matrix may be referred to as a Real valued matrix. On the other hand, the matrix shown in FIG. 4 may be referred to as a Binary matrix, because the relationship between the student ID and the slide ID is shown using binary values.

Returning to FIG. 3, the clustering execution unit 12 applies or performs co-clustering to the matrix generated by the pre-processing unit 21. For example, the clustering execution unit 12 may use Stochastic Block Model, Spectral Methods, Infinite Relational Model, or the like in order to perform co-clustering. The clustering execution unit 12 may apply co-clustering to the matrix and the evaluation information generated by the pre-processing unit 21.

The post-processing unit 13 generates confirmation data using an execution result of the co-clustering. The confirmation data may be, for example, a bipartite graph. In addition to the bipartite graph, the post-processing unit 13 may rearrange rows and columns of the matrix generated by the pre-processing unit 21 so that those belonging to the same cluster become continuous and create a heat map. In the heat map, boundary lines are drawn between the respective clusters. Here, the bipartite graph generated by the post-processing unit 13 using the execution result of the co-clustering will be described with reference to FIG. 5.

Figure 5:
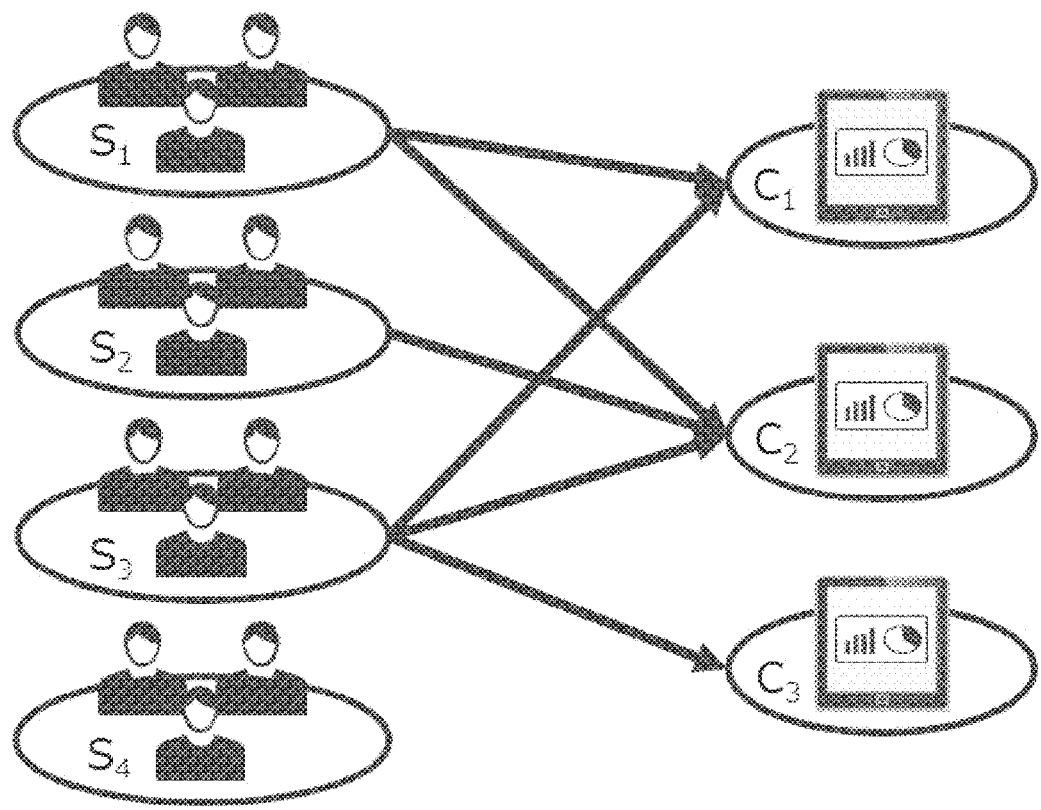
FIG. 5 shows confirmation data according to the second example embodiment.

FIG. 5 shows that student clusters S1 to S4 and slide clusters C1 to C3 are associated with each other. Each of the student clusters S1 to S4 includes at least one or more students. In other words, the plurality of students are classified into the student clusters S1 to S4. Each of the slide clusters C1 to C3 includes at least one slide. In other words, a plurality of slides included in one content are classified into slide clusters C1 to C3. The students classified into the student clusters S1 to S4 and the slides classified into the slide clusters C1 to C3 are determined by performing co-clustering.

Furthermore, each of arrows (which may be referred to as an edge) connecting a student cluster to a slide cluster is set according to a time taken for a student included in a student cluster to view a slide included in a slide cluster. FIG. 5 shows that an average time that the students classified into the student cluster S1 view the slides classified into the slide clusters C1 and C2 exceeds a predetermined time. Further, FIG. 5 shows that an average time that the students classified into the student cluster S2 view the slides classified into the slide cluster C2 exceeds the predetermined time. Furthermore, FIG. 5 shows that an average time that the students classified into the student cluster S3 view the slides classified into the slide clusters C1 to C3 exceeds the predetermined time. Moreover, FIG. 5 shows that the students classified into the student cluster S4 have viewed each slide included in the content for a time shorter than the predetermined time. The absence of an arrow between a student cluster and a slide cluster indicates that an average time that students in that student cluster have viewed slides classified into that slide cluster is less than the predetermined time. Returning to FIG. 3, the post-processing unit 13 outputs the bipartite graph generated as the confirmation data to the display unit 22. The display unit 22 may be, for example, a display. The display unit 22 displays the bipartite graph received from the post-processing unit 13.

Further, the post-processing unit 13 may include additional information in the bipartite graph shown in FIG. 5 to generate the confirmation data. The additional information may be, for example, statistical information about statistics on test scores taken by the student after viewing the content. The phrase "after viewing the content" may be rephrased as, for example, "after the lecture". The statistical information about the test scores may be information indicating a distribution of the test scores of the students classified into each of the student clusters. Further, the additional information may be, for example, information for identifying each of the plurality of slides included in the slide cluster.

Figure 6:
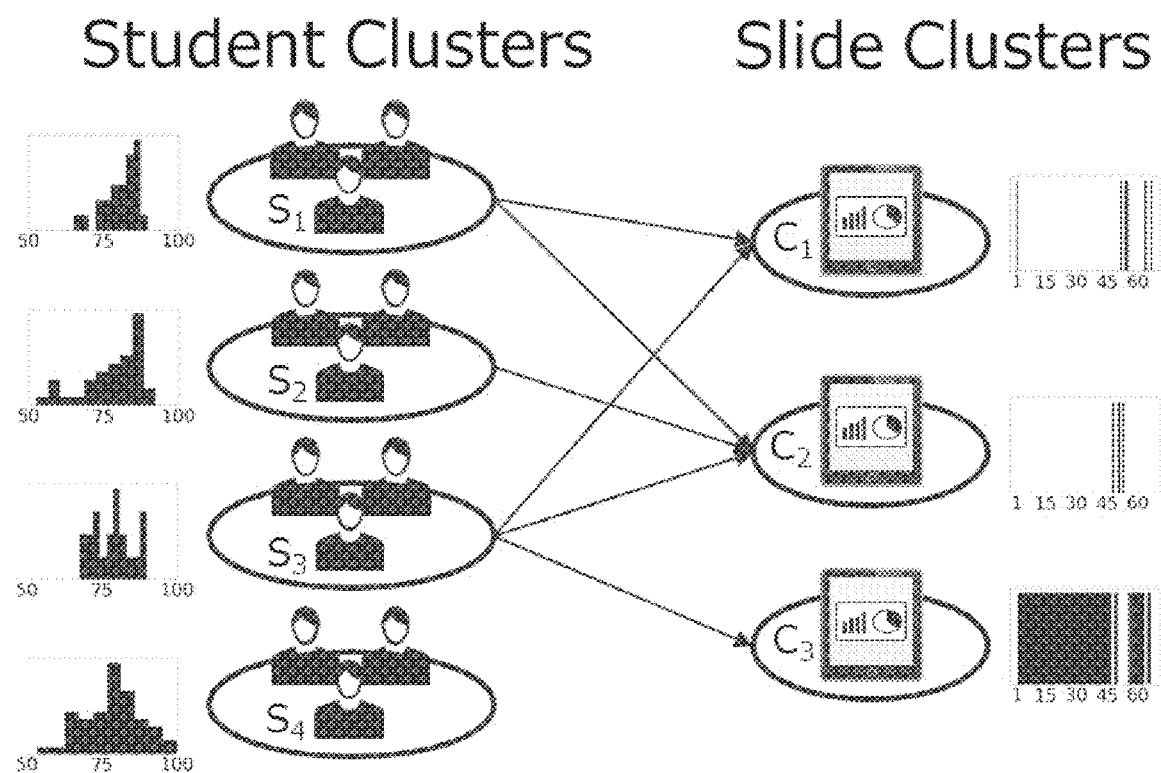
FIG. 6 is a diagram showing the confirmation data according to the second example embodiment.

FIG. 6 shows the confirmation data including the bipartite graph of FIG. 5 and the additional information. The graphs shown to the left of the student clusters show test score statistical information. In each of the graphs shown to the left of the student clusters, the X axis represents the test score, and the Y axis represents the number of students who have acquired the corresponding test score shown on the X axis. The graphs shown to the right of the slide clusters show information indicating the slides included in the slide clusters. In each of the graphs shown to the right of the slide cluster, the X axis represents the slide ID, and the line above each slide ID indicates that the corresponding slide ID is included in the slide cluster. In other words, when a line is shown above 1 on the X axis, the slide cluster includes a slide whose slide ID is 1. Although two pieces of the additional information are displayed in FIG. 6, the post-processing unit 13 may display only one piece of the additional information between the two pieces of the additional information on the display unit 22.

Figure 7:
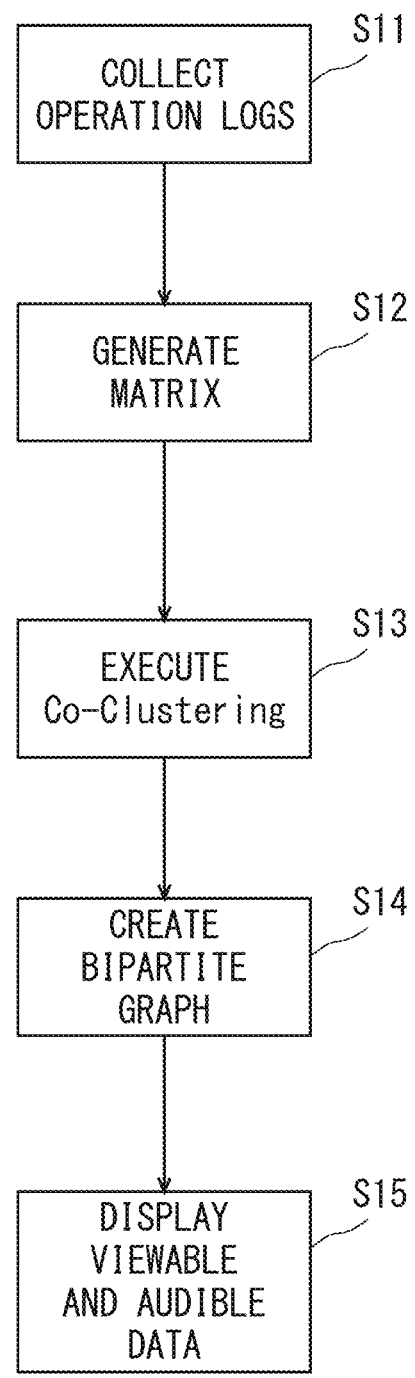
FIG. 7 is a diagram showing a processing flow for generating the confirmation data according to the second example embodiment.

Next, a flow of processing for generating the confirmation data according to the second example embodiment will be described with reference to FIG. 7. First, the information collection unit 11 collects operation logs via a network (S11). The information collection unit 11 may collect the evaluation information together with the operation log.

Next, the pre-processing unit 21 generates a matrix using information included in the operation log (S12).

Next, the clustering execution unit 12 executes co-clustering on a matrix generated by the pre-processing unit 21 (S13). By performing the co-clustering, the student IDs and slide IDs associated in the matrix are classified into student clusters and slide clusters.

Next, the post-processing unit 13 generates a bipartite graph as confirmation data using an execution result of the co-clustering (S14). The post-processing unit 13 may further include additional information in the bipartite graph to create the confirmation data.

Next, the post-processing unit 13 outputs the generated confirmation data to the display unit 22 and causes the display unit 22 to display the confirmation data (S15).

As described above, the information processing apparatus 20 according to the second example embodiment can perform co-clustering using an operation log and evaluation information, and generate a bipartite graph using a result of the co-clustering. The bipartite graph is used to visually recognize the relationship between the student clusters and the slide clusters. For example, a teacher can improve the lecture material or the lecture plan using the result of the bipartite graph.

Third Example Embodiment

Figure 8:
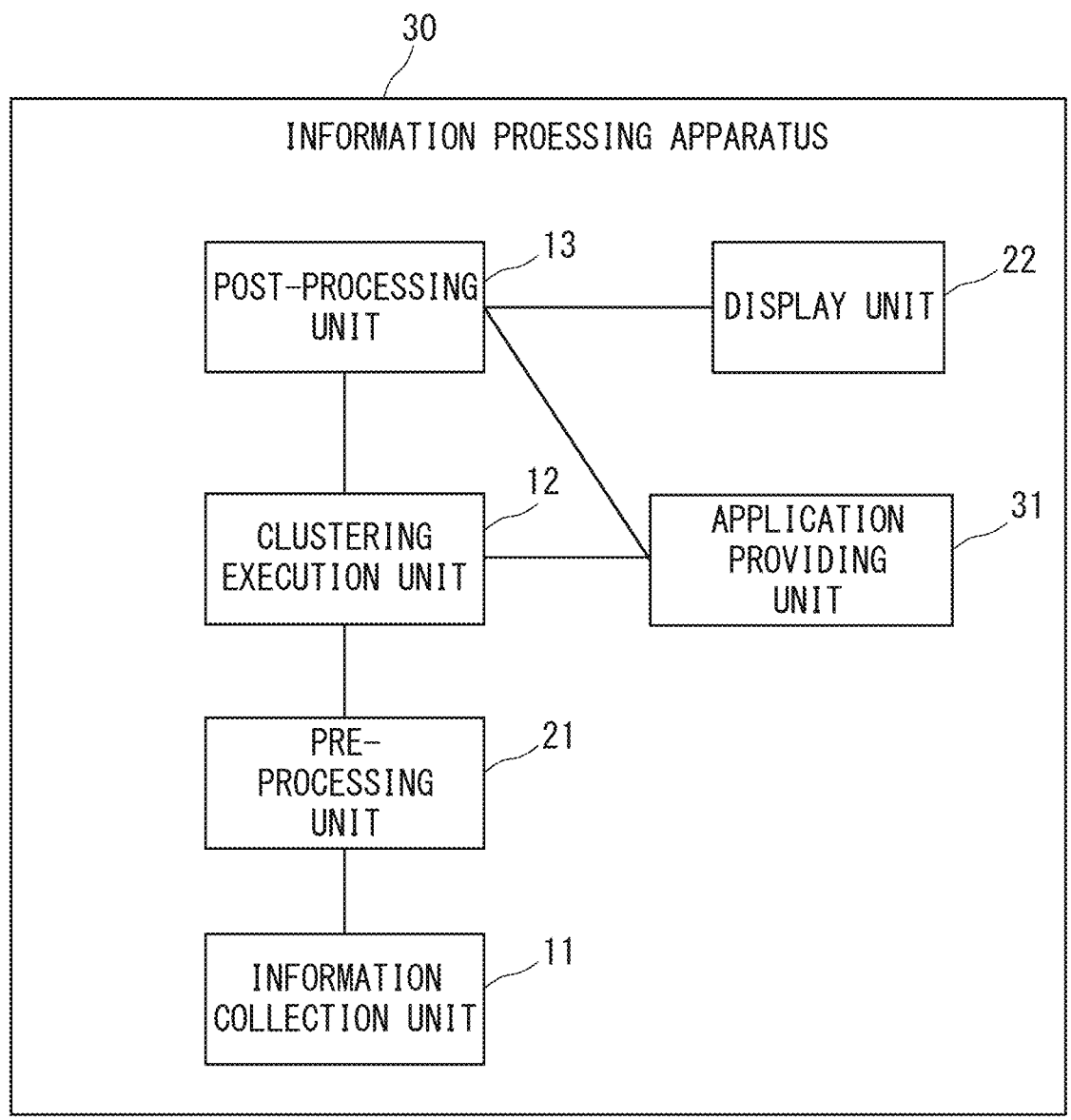
FIG. 8 is a configuration diagram of an information processing apparatus according to a third example embodiment.

Next, a configuration example of an information processing apparatus 30 according to a third example embodiment will be described with reference to FIG. 8. The information processing apparatus 30 further includes an application providing unit 31 in addition to the components of the information processing apparatus 20 described in FIG. 3. Since components other than the application providing unit 31 in the information processing apparatus 30 are the same as those of the information processing apparatus 20, detailed descriptions of the same components are omitted.

The application providing unit 31 receives an execution result of co-clustering used when the confirmation data of FIG. 5 is generated from the clustering execution unit 12. Alternatively, the application providing unit 31 may receive an execution result of co-clustering used when the confirmation data of FIG. 5 is generated via the post-processing unit 13. Further alternatively, the application providing unit 31 may receive, via the post-processing unit 13, the additional information together with the execution result of the co-clustering used when the confirmation data of FIG. 5 is generated. Further alternatively, the application providing unit 31 may receive the execution result of the co-clustering via the clustering execution unit 12 and receive the additional information via the post-processing unit 13.

The application providing unit 31 provides the following application to a teacher who gives a lecture using a digital device using the received execution result of the co-clustering.

For example, the application providing unit 31 may generate information indicating a matter of an optimal test to be assigned to a student using the execution result of the co-clustering. The information indicating the matter of an optimal test may be referred to as, for example, a "Test Design". For example, a test design using the execution result of the co-clustering used when the confirmation data of FIG. 6 is generated will be described.

The test design may include the following matters as the matter of the optimum test.

(1) For the students included in the student cluster S1, test questions are created from the slides included in the slide cluster C3.

(2) For the students included in the student cluster S2, test questions are created from the slides included in the slide clusters C1 and C3.

(3) For the students included in the student cluster S4, test questions are created from the slides included in the slide clusters C1 to C3.

(1) This is intended to make the students included in the student cluster S1 understand the matters of the slide cluster C3, based on a result that the students included in the student cluster S1 have not sufficiently viewed the slides included in the slide cluster C3.

(2) This is intended to make the students included in the student cluster S2 understand the matters of the slide clusters C1 and C3, based on a result that the students included in the student cluster S2 have not sufficiently viewed the slides included in the slide clusters C1 and C3.

(3) This is intended to make the students included in the student cluster S4 understand the matters of the slide clusters C1 to C3, based on a result that the students included in the student cluster S4 have not sufficiently viewed all the slides.

The detail of the test generated by the application providing unit 31 is not limited to (1) to (3), matters of the test other than (1) to (3) may be generated.

Alternatively, the application providing unit 31 may generate information indicating an optimal combination (group) of students to participate in a lecture using the execution result of the co-clustering. The information indicating an optimal combination of students may be referred to as, for example, a group formation. For example, a group formation using the execution result of co-clustering used when the confirmation data of FIG. 6 is generated will be described.

The group formation may include the following matters as an optimal combination of students: (A) groups are created so that, each group includes at least one student from the student cluster S1, at least one student from the student cluster S2, at least one student from the student cluster S3, and at least one student from the student cluster S4, as members of the group. (B) Groups are created so that, each group includes students from the same student cluster, as members of the group.

The group organization of (A) is based on the assumption that when, for example, a group discussion is conducted, by gathering students with deep knowledge in slides different from each other, students can supplement each others' knowledge. On the other hand, the group organization of (B) is based on the assumption that, when a supplementary lesson is conducted for a small number of students, by gathering students who have not studied the same content, a teacher can efficiently conduct the supplementary lesson.

The combination of students generated by the application providing unit 31 is not limited to (1), and the matters of the test other than (1) may be generated.

Alternatively, the application providing unit 31 may re-edit a structure of the lecture material (content) using the execution result of the co-clustering. The re-editing of the structure of the lecture material may be referred to as, for example, "Restructuring course material". The re-editing of the structure of the lecture material may be, for example, the teacher creating a lecture material for a lecture to be conducted next time. For example, re-editing of the structure of the lecture material using the execution result of the co-clustering used when the confirmation data of FIG. 6 is generated will be described. Here, the execution results of the co-clustering show the results of lectures that have been conducted so far (e.g., Lecture 1). A lecture to be conducted next time using the re-edited lecture material shall be referred to as a Lecture 2.

The re-editing of the structure of the lecture material may be performed as follows.

(1) For the students included in the student cluster S1, in the Lecture 2, the slides included in the slide cluster C3 that are included in the lecture material for the Lecture 1 are added to the beginning of the content.

(2) For the students included in the student cluster S2, in the Lecture 2, the slides included in the slide clusters C1 and C3 that are included in the lecture material for the Lecture 1 are added to the beginning of the content.

For example, (1) intends the following matter. The students included in the student cluster S1 have not viewed the slides included in the slide cluster C3 for a sufficient time. Thus, in the Lecture 2, a description is started from the slides included in the slide cluster C3 for the students included in the student cluster S1.

For example, (2) intends the following matter. The students included in the student cluster S2 have not viewed the slides included in the slide clusters C1 and C2 for a sufficient time. Thus, in the Lecture 2, a description is started from the slides included in the slide clusters C1 and C2 for the students included in the student cluster S2.

As described above, the information processing apparatus 30 according to the third example embodiment provides an application for generating information effective for a teacher to improve students' understanding of a lecture using an execution result of co-clustering. That is, the teacher can improve the lecture by using the execution result of the co-clustering. The teacher can appropriately select the directionality of the lecture, materials used for the lecture, and the like by using the information generated in the information processing apparatus 30

Figure 9:
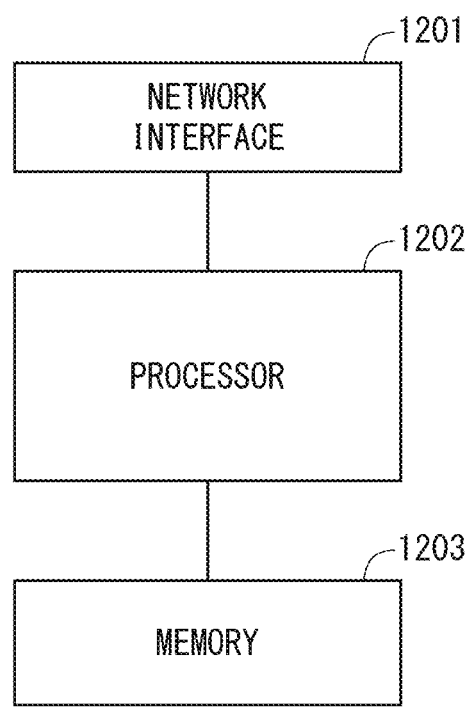
FIG. 9 is a configuration diagram of an information processing apparatus according to each example embodiment.

FIG. 9 is a block diagram showing a configuration example of the information processing apparatuses 10 to 30 (hereinafter referred to as the information processing apparatus 10 and the like). Referring to FIG. 9, the information processing apparatus 10 and the like include a network interface 1201, a processor 1202, and a memory 1203. The network interface 1201 is used to communicate with other network node apparatuses constituting a communication system. The network interface 1201 may include, for example, a network interface card (NIC) compliant with IEEE 802.3 series. Alternatively, the network interface 1201 may be used to perform wireless communication. For example, the network interface 1201 may be used to perform wireless LAN communication or mobile communication defined by 3GPP (3rd Generation Partnership Project).

The processor 1202 reads software (computer program) from the memory 1203 and executes it, thereby performing the processing of the information processing apparatus 10 and the like described using the flowcharts or sequences in the above-described example embodiments. The processor 1202 may be, for example, a microprocessor, an MPU (Micro Processing Unit), or a CPU (Central Processing Unit). The processor 1202 may include a plurality of processors.

The memory 1203 is composed of a combination of a volatile memory and a nonvolatile memory. The memory 1203 may include a storage located physically separated from the processor 1202. In this case, the processor 1202 may access the memory 1203 via an I/O interface (not shown).

In the example of FIG. 9, the memory 1203 is used to store software module groups. The processor 1202 can perform the processing of the information processing apparatus 10 and the like described in the above-described example embodiments by reading these software modules from the memory 1203 and executing them.

As described with reference to FIG. 9, each of the processors included in the information processing apparatus 10 and the like executes one or a plurality of programs including instructions for causing a computer to execute the algorithm described with reference to the drawings.

In the above example, the program can be stored and provided to a computer using any type of non-transitory computer readable media. Non-transitory computer readable media include any type of tangible storage media. Examples of non-transitory computer readable media include magnetic storage media, optical magnetic storage media (e.g. magneto-optical disks), CD-ROM (Read Only Memory), CD-R, CD-R/W, and semiconductor memories. The magnetic storage media may be, for example, floppy disks, magnetic tapes, hard disk drives, etc. The semiconductor memory may be, for example, mask ROM, PROM (Programmable ROM), EPROM (Erasable PROM), flash ROM, RAM (Random Access Memory), etc. The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that the present disclosure is not limited to the above-described example embodiments, and can be modified as appropriate without departing from the spirit of the present disclosure.

The whole or part of the embodiments disclosed above can be described as, but not limited to, the following supplementary notes.

(Supplementary Note 1)

An information processing apparatus comprising:

an information collection unit configured to collect an operation log generated when a digital device is operated from a plurality of the digital devices;

an execution unit configured to co-cluster operator information and content information, the operator information identifying an operator of the digital device included in a plurality of the operation logs, and the content information about content viewed by the operator using the digital device; and a post-processing unit configured to create confirmation data using an execution result of the co-clustering.

(Supplementary note 2)

The information processing apparatus according to Supplementary note 1, wherein the content information includes slide information for identifying a plurality of slides included in the content.

(Supplementary Note 3)

The information processing apparatus according to Supplementary note 2, wherein the post-processing unit is configured to create a bipartite graph, an operator cluster being associated with a slide cluster in the bipartite graph using information about a time taken for the operator to view each slide, and the operator cluster including a plurality of pieces of the operator information and the slide cluster including a plurality of pieces of the slide information.

(Supplementary Note 4)

The information processing apparatus according to Supplementary note 3, wherein the post-processing unit is configured to create the confirmation data including additional information related to the operator cluster and the slide cluster in addition to the bipartite graph.

(Supplementary Note 5)

The information processing apparatus according to Supplementary note 4, wherein the post processing unit is configured to use statistical information about statistics of scores of a test conducted after a plurality of the operators view the content.

(Supplementary Note 6)

The information processing apparatus according to Supplementary note 4 or 5, wherein the post-processing unit is configured to use identification information for identifying each of the plurality of slides included in the slide cluster as the additional information.

(Supplementary Note 7)

The information processing apparatus according to any one of Supplementary notes 1 to 6, wherein the post-processing unit is configured to output the confirmation data to a display apparatus.

(Supplementary Note 8)

The information processing apparatus according to any one of Supplementary notes 1 to 7, further including an application providing unit configured to provide an application used to improve a lecture using the content.

(Supplementary Note 9)

The information processing apparatus according to Supplementary note 8, wherein the application providing unit is configured to generate at least one of information indicating a matter of a test to be taken by the operator, information indicating a combination of the operators used for a group work and a supplementary lesson of a lecture, and information indicating a configuration of the plurality of slides included in the content.

(Supplementary Note 10)

A method of generating data comprising:

collecting an operation log generated when a digital device is operated from a plurality of the digital devices;

co-clustering operator information and content information, the operator information for identifying an operator of the digital device included in a plurality of the operation logs, and the content information being about content viewed by the operator using the digital device; and creating confirmation data using an execution result of the co-clustering.

(Supplementary Note 11)

A non-transitory computer readable medium storing a program causing a computer to execute:

collecting an operation log generated when a digital device is operated from a plurality of the digital devices;

co-clustering operator information and content information, the operator information for identifying an operator of the digital device included in a plurality of the operation logs, and the content information being about content viewed by the operator using the digital device; and creating confirmation data using an execution result of the co-clustering. Each of the above-described embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. An information processing apparatus comprising:
at least one memory storing instructions; and
at least one processor configured to execute the instructions to:
collect an operation log generated when a digital device is operated from a plurality of the digital devices;
co-cluster operator information and content information, the operator information for identifying an operator of the digital device included in a plurality of the operation logs, and the content information being about content viewed by the operator using the digital device; and
create confirmation data using an execution result of the co-clustering,
wherein the content information includes slide information for identifying a plurality of slides included in the content; and
wherein the at least one processor of the information processing apparatus is further configured to execute the instructions to create a bipartite graph, an operator cluster being associated with a slide cluster in the bipartite graph using information about a time taken for the operator to view each slide, and the operator cluster including a plurality of pieces of the operator information and the slide cluster including a plurality of pieces of the slide information.

2. The information processing apparatus according to claim 1, wherein
the at least one processor of the information processing apparatus is further configured to execute the instructions to create the confirmation data including additional information related to the operator cluster and the slide cluster in addition to the bipartite graph.

3. The information processing apparatus according to claim 2, wherein
the at least one processor of the information processing apparatus is further configured to execute the instructions to use statistical information about statistics of scores of a test conducted after a plurality of the operators view the content.

4. The information processing apparatus according to claim 2, wherein
the at least one processor of the information processing apparatus is further configured to execute the instructions to use identification information for identifying each of the plurality of slides included in the slide cluster as the additional information.

5. The information processing apparatus according to claim 1, wherein
the at least one processor of the information processing apparatus is further configured to execute the instructions to output the confirmation data to a display apparatus.

6. The information processing apparatus according to claim 1, wherein the at least one processor of the information processing apparatus is further configured to execute the instructions to provide an application used to improve a lecture using the content.

7. The information processing apparatus according to claim 6, wherein
the at least one processor of the information processing apparatus is further configured to execute the instructions to generate at least one of information indicating a matter of a test to be taken by the operator, information indicating a combination of the operators used for a group work and a supplementary lesson of a lecture, and information indicating a configuration of the plurality of slides included in the content.

8. A method of generating data comprising:
collecting an operation log generated when a digital device is operated from a plurality of the digital devices;
co-clustering operator information and content information, the operator information for identifying an operator of the digital device included in a plurality of the operation logs, and the content information being about content viewed by the operator using the digital device; and
creating confirmation data using an execution result of the co-clustering,
wherein the content information includes slide information for identifying a plurality of slides included in the content; and
wherein the method further comprises creating a bipartite graph, an operator cluster being associated with a slide cluster in the bipartite graph using information about a time taken for the operator to view each slide, and the operator cluster including a plurality of pieces of the operator information and the slide cluster including a plurality of pieces of the slide information.

9. A non-transitory computer readable medium storing a program causing a computer to execute:
collecting an operation log generated when a digital device is operated from a plurality of the digital devices;
co-clustering operator information and content information, the operator information for identifying an operator of the digital device included in a plurality of the operation logs, and the content information being about content viewed by the operator using the digital device; and
creating confirmation data using an execution result of the co-clustering,
wherein the content information includes slide information for identifying a plurality of slides included in the content; and
wherein the program further causes the computer to execute creating a bipartite graph, an operator cluster being associated with a slide cluster in the bipartite graph using information about a time taken for the operator to view each slide, and the operator cluster including a plurality of pieces of the operator information and the slide cluster including a plurality of pieces of the slide information.

\* \* \* \* \*